United States Patent [19]

Aono et al.

[11] Patent Number: 5,109,451
[45] Date of Patent: Apr. 28, 1992

[54] ORTHOGONAL TRANSFORM CODING SYSTEM FOR IMAGE DATA

[75] Inventors: Tomoko Aono; Masao Izumi, both of Tenri, Japan

[73] Assignee: Sharp Kabushiki Kaisha, Osaka, Japan

[21] Appl. No.: 257,763

[22] Filed: Jun. 28, 1991

Related U.S. Application Data

[63] Continuation of Ser. No. 342.817, Apr. 25, 1989, abandoned.

[30] Foreign Application Priority Data

Apr. 28, 1988 [JP] Japan .................. 63-105980
Apr. 28, 1988 [JP] Japan .................. 63-105981

[51] Int. Cl.⁵ .................................................. G06K 9/36
[52] U.S. Cl. ................................. 382/56; 382/41; 382/43; 358/133
[58] Field of Search ............. 381/37, 45, 49, 50; 364/725; 358/133, 138, 433; 382/1, 43, 41, 49, 56

[56] References Cited

U.S. PATENT DOCUMENTS

| | | | |
|---|---|---|---|
| 4,048,443 | 9/1977 | Crochiere et al. | 381/37 |
| 4,179,709 | 12/1979 | Workman | 358/133 |
| 4,184,049 | 1/1980 | Crochiere et al. | 179/1 SA |
| 4,189,748 | 2/1980 | Reis | 358/133 |
| 4,375,650 | 3/1983 | Tiemann | 364/725 |
| 4,504,860 | 3/1985 | Nicol et al. | 358/133 |
| 4,707,738 | 11/1987 | Ferre et al. | 358/138 |
| 4,734,767 | 3/1988 | Kaneko et al. | 358/133 |
| 4,805,030 | 2/1989 | Tanaka | 358/133 |
| 4,807,042 | 2/1989 | Tanaka | 364/725 |
| 4,841,012 | 9/1985 | Tescher | 358/133 |

Primary Examiner—Michael Razavi
Assistant Examiner—Jose L. Couso

[57] ABSTRACT

An orthogonal transform coding system for images which orthogonally transforms image data to spatial frequencies and divides the domain of the spatial frequencies into low and high frequency domains using a plurality of domain patterns prepared in advance. This system quantizes and encodes the high and low frequency domains of the orthogonally transformed data by different methods. Coding of the data in the low frequency domain is preformed based on bits which are allocated to those data in accordance with their energies. The data in the high frequency domain are decomposed into bit planes and run-length coding is performed for each bit plane, whereby a small number of bits are allocated to those data in the low frequency domain in the coding and an efficient coding of images is accomplished.

16 Claims, 11 Drawing Sheets

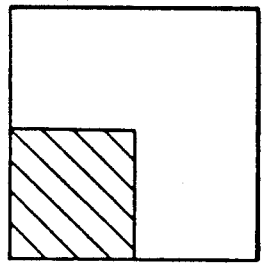
Fig.3(a)
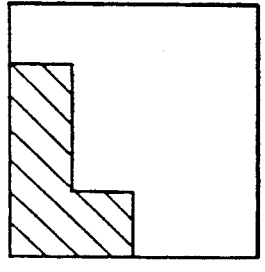
Fig.3(b)
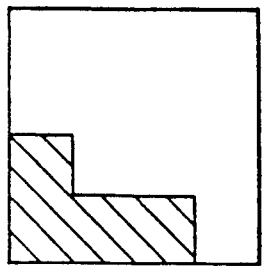
Fig.3(c)
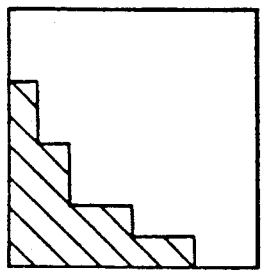
Fig.3(d)
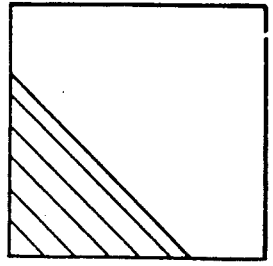
Fig.3(e)
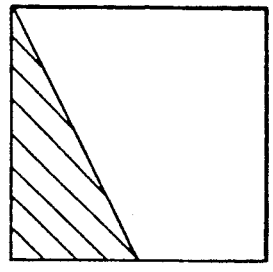
Fig.3(f)
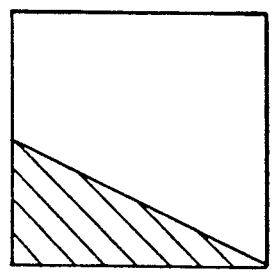
Fig.3(g)
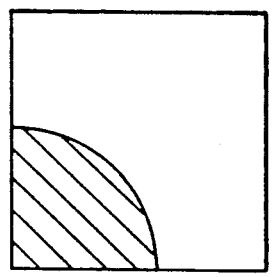
Fig.3(h)
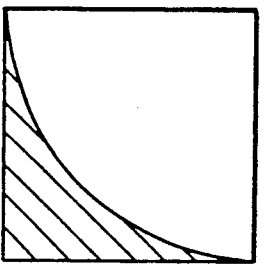
Fig.3(i)
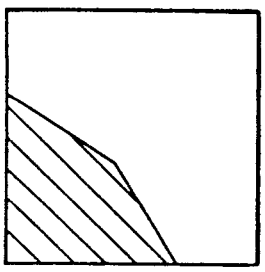
Fig.3(j)
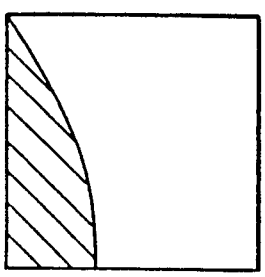
Fig.3(k)
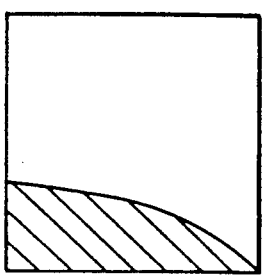
Fig.3(ℓ)

Fig. 4

| 30975 | -9874 | 6324 | -329 | 198 | 256 | -103 | 95 | 112 | -187 | 12 | -20 | 19 | 5 | -3 | 0 |
|---|---|---|---|---|---|---|---|---|---|---|---|---|---|---|---|
| 8794 | -6237 | -1036 | -204 | 98 | -256 | 511 | -84 | 5 | 13 | -2 | -6 | -3 | -1 | 0 | 0 |
| -8067 | 6093 | -3024 | 105 | -75 | 25 | 21 | -26 | -7 | 18 | 10 | 23 | -19 | 15 | 2 | 0 |
| -7034 | 5094 | -1096 | 204 | 25 | -12 | 9 | -10 | -2 | -17 | 8 | 19 | 22 | 32 | 0 | 0 |
| -1029 | -3123 | 512 | -108 | 91 | -70 | 8 | -5 | 13 | -2 | 4 | 2 | -18 | -76 | 7 | -5 |
| 357 | 243 | 294 | 58 | 20 | 5 | 23 | 12 | 20 | 11 | -7 | -17 | 51 | 93 | -25 | 13 |
| 298 | 121 | 111 | 92 | 0 | 3 | 5 | 11 | 9 | 0 | 9 | 0 | -10 | -23 | 8 | -6 |
| -110 | -90 | 80 | 71 | 9 | 21 | -1 | -6 | 7 | 9 | 5 | 8 | -10 | -12 | 3 | 0 |
| -87 | 80 | 54 | -18 | -3 | 17 | 9 | -4 | -5 | -3 | -6 | 7 | -8 | 7 | 2 | 0 |
| 98 | 101 | 72 | -29 | 0 | -7 | 4 | 2 | 9 | 0 | -3 | -5 | -2 | 19 | -1 | 0 |
| -54 | -87 | -51 | 52 | 1 | 3 | -2 | -9 | 7 | -8 | 9 | 4 | 10 | 21 | -4 | 0 |
| -74 | 32 | 24 | -13 | 9 | 23 | -10 | 8 | 6 | -3 | 1 | 2 | 8 | -16 | 6 | 1 |
| -16 | 5 | -3 | -2 | -11 | 51 | 12 | 8 | -3 | 9 | 2 | -5 | -7 | -9 | 3 | -1 |
| 19 | 13 | 7 | -16 | -32 | 70 | -41 | 29 | 7 | -3 | -2 | 0 | -9 | 20 | -1 | 0 |
| 4 | 2 | -6 | -9 | -11 | 30 | 13 | -7 | 1 | 0 | -8 | 7 | 3 | -1 | 2 | 0 |
| 0 | 0 | 0 | 3 | 8 | 19 | -10 | 2 | 0 | 0 | -2 | 1 | 0 | 0 | 0 | 0 |

|  | | $x_{11}$ | $x_{12}$ |
|---|---|---|---|
|  | $x_{21}$ | $x_{22}$ | $x_{23}$ |
|  | $x_{31}$ | $x_{32}$ | $x_{33}$ |
| $x_{41}$ | $x_{42}$ | $x_{43}$ | $x_{44}$ |

$X_{11} \rightarrow y_4$     $X_{41} \rightarrow y_1$
$X_{12} \rightarrow y_2$     $X_{42} \rightarrow y_3$
$X_{21} \rightarrow y_4$     $X_{43} \rightarrow y_1$
$X_{22} \rightarrow y_1$     $X_{44} \rightarrow y_1$
$X_{23} \rightarrow y_3$
$X_{31} \rightarrow y_2$
$X_{32} \rightarrow y_1$
$X_{33} \rightarrow y_1$

ORTHOGONAL TRANSFORM CODING SYSTEM FOR IMAGE DATA

This application is a continuation of application Ser. No. 07/342,817 filed on Apr. 25, 1989, now abandoned.

BACKGROUND OF THE PRESENT INVENTION

The present invention relates to a system for source coding of an image which is designed for data compression, and more particularly, to an orthogonal transform coding of images.

A two-dimensional full color still image is made up of a huge volume of information, but the image data carry a pronounced redundancy, which it is possible to eliminate.

A conventional way of such image compression converts each pixel value to spatial frequency components by applying orthogonal transform, such as Fourier transform, Hadamard transform, Haar transform, cosine transform, or Karhunen- Loeve transform (KL transform), all for eliminating redundancy from image data. Since, in such an image compression method, energy concentrates on a specific spatial frequency component as a result of the transform mentioned above, the data can be reduced by allocating a large number of bits to a spatial frequency component with a large amount of energy and a small number of bits to a spatial frequency component with a small amount of energy. FIG. 11 illustrates in a block diagram a coding device for carrying out an orthogonal transform coding of images wherein the bit allocation as mentioned above is practiced.

The image coding device of FIG. 11 operates as follows. Full-color still image data (for example, data in three primary colors—red (R), green (G), and blue (B)—and with a size N×N) are transformed into luminance signals (Y) and color-difference signals (I, Q) at a preprocessor 1. This transform into a YIQ system is done for the following reason: whereas an RGB system has a large degree of redundancy because of high correlations between color components, the use of an orthogonal system in the YIQ system reduces the redundancy considerably because of low correlations between the luminance and the color difference; moreover, since, in a YIQ system, man's vision is much less sensitive to a lack of precision in I and Q components than in Y components, thus the characteristics of man's vision permit the I and Q components to be coded in a rough mode and the coding, as a whole, can be reduced in volume accordingly. An RGB system is transformed into its corresponding YIQ system in accordance with the following formula.

$$\begin{bmatrix} Y \\ I \\ Q \end{bmatrix} = \begin{bmatrix} 0.299 & 0.587 & 0.114 \\ 0.596 & -0.274 & -0.322 \\ 0.211 & -0.523 & 0.312 \end{bmatrix} \begin{bmatrix} R \\ G \\ B \end{bmatrix}$$

The data transformed into a YIQ system are then transformed into spatial frequency components having conversion axes, which are independent of each other, at an orthogonal transform circuit 2. The orthogonally transformed image data, thereby obtained, are received by an encoder 3 where each frequency component is allocated bits according to the energy given to each frequency component, and then the data are quantized and encoded according to the bits allocated to them and recorded in a recording device 4.

A reconstructed image is reproduced on an image reproducing device 7 by decoding the recorded data in the following manner: the orthogonally transformed data recorded in the recording device 4 are read out and received by a decoder 5, and the data obtained by decoding at the decoder 5 are entered into an inverse transform circuit 6 where the data are inverse transformed to the transform at the orthogonal transform circuit 2. The data are then transformed from the YIQ system to the RGB system which reverses the data to the RGB signals, which reproduce the reconstructed image on the image-reproducing device 7. The inverse transform from the YIQ system to the RGB system is performed in accordance with the following formula:

$$\begin{bmatrix} R \\ G \\ B \end{bmatrix} = \begin{bmatrix} 1.0 & 0.956 & 0.621 \\ 1.0 & -0.272 & -0.647 \\ 1.0 & -1.106 & 1.703 \end{bmatrix} \begin{bmatrix} Y \\ I \\ Q \end{bmatrix}$$

It is known that, whereas man's vision is sensitive to low frequency domain of spatial frequencies (i.e., areas of small change, as well as, regions which are relatively flat), man's vision is much less sensitive to errors in high frequency domain (i.e., areas of large change such as edge).

In the practice of the above-mentioned method, however, because the number of bits to be allocated to each spatial frequency component is decided based only on the magnitude of the energy of the frequency components, it occurs that a large number of bits are allocated even to high frequency components if their energies are large. In other words, the above method cannot realize an efficient compression of image data.

SUMMARY OF THE PRESENT INVENTION

A primary object of the present invention is to provide a system for orthogonal transform coding of images by which image compression can be efficiently performed without involving impairment of the picture quality.

Another object of the present invention is provide a system for orthogonal transform coding of images by which the volume of image data in a high frequency domain can be made constant irrespective of image, and accordingly, the image data in the high frequency domain can be compressed at a fixed rate, resulting in an efficient data compression.

To accomplish the above-mentioned object, an orthogonal transform coding system for image data comprises steps of (a) orthogonally transforming the image data from space coordinates to spatial frequencies, (b) preparing a plurality of domain patterns each of which has low and high frequency domains therein and is used for dividing a spatial frequency domain of orthogonally transformed image data into a low frequency domain and a high frequency domain according to a threshold, (c) summing absolute values of the orthogonally transformed data belonging to the low frequency domain of each of said domain patterns, (d) specifying the low frequency domain of a domain pattern in which the sum of the absolute values is the largest as a low frequency domain of the orthogonally transformed image data and specifying the high frequency domain of the same domain pattern as a high frequency domain of the orthogonally transformed image data, (e) encoding the orthogonally transformed data in the low frequency domain by dividing the low frequency domain into a plurality of blocks and calculating respective mean values of the orthogonally transformed data in the blocks so as to allocate a large number of bits to a block which has a mean value larger than a specified value and a small number of bits to a block which has a mean value smaller than the specified value, and (f) encoding the orthogonally transformed data in the high frequency domain in a manner different from that for encoding the orthogonally transformed data in the low frequency domain so as to allocate a small number of bits to the high frequency domain.

It is preferable that the step of encoding of the orthogonally transformed image data in the high frequency domain includes steps of decomposing these data into bit planes and performing run length coding for each bit plane.

It is also preferable that the encoding of the orthogonally transformed image data in the high frequency domain includes steps of dividing the high frequency domain into a plurality of blocks and comparing data patterns of the orthogonally transformed data in the respective blocks with a limited number of representative data patterns that are stored in a memory so as to select representative patterns which are the closest to the respective data patterns of the orthogonally transformed image data with respect to each of the blocks so as to encode the high frequency domain of the orthogonally transformed data according to indexes representing selected representative patterns.

According to the present invention, because the low frequency domain of the data to which man's vision is sensitive is separated from the high frequency domain of the data with which man's vision is less sensitive, different methods are applied to the coding of the two respective domains, allocating a large number of bits to the low frequency domain and a small number of bits to the high frequency domain, so that the image data can be compressed at a much higher rate than in the prior art without involving impairment of the picture quality.

Furthermore, according to the present invention, the orthogonally transformed data in the high frequency domain can be compressed at a certain compression rate irrespective of an input image.

BRIEF DESCRIPTION OF THE DRAWINGS

The present invention will become more fully understood from the detailed description given below and the accompanying drawings which are given by way of illustration only, and thus are not limitative of the present invention, and wherein:

FIGS. 3(a)-3(l) illustrate various domain patterns;

FIG. 4 is an example of the DCT coefficients obtained after DCT-based orthogonal transform;

FIGS. 8(a) and (b) show coding in a high frequency domain as another example of the present invention;

FIGS. 9(a)-(e) show an example of vector quantization in the high frequency domain;

DETAILED DESCRIPTION OF PREFERRED EMBODIMENTS

Figure 1:
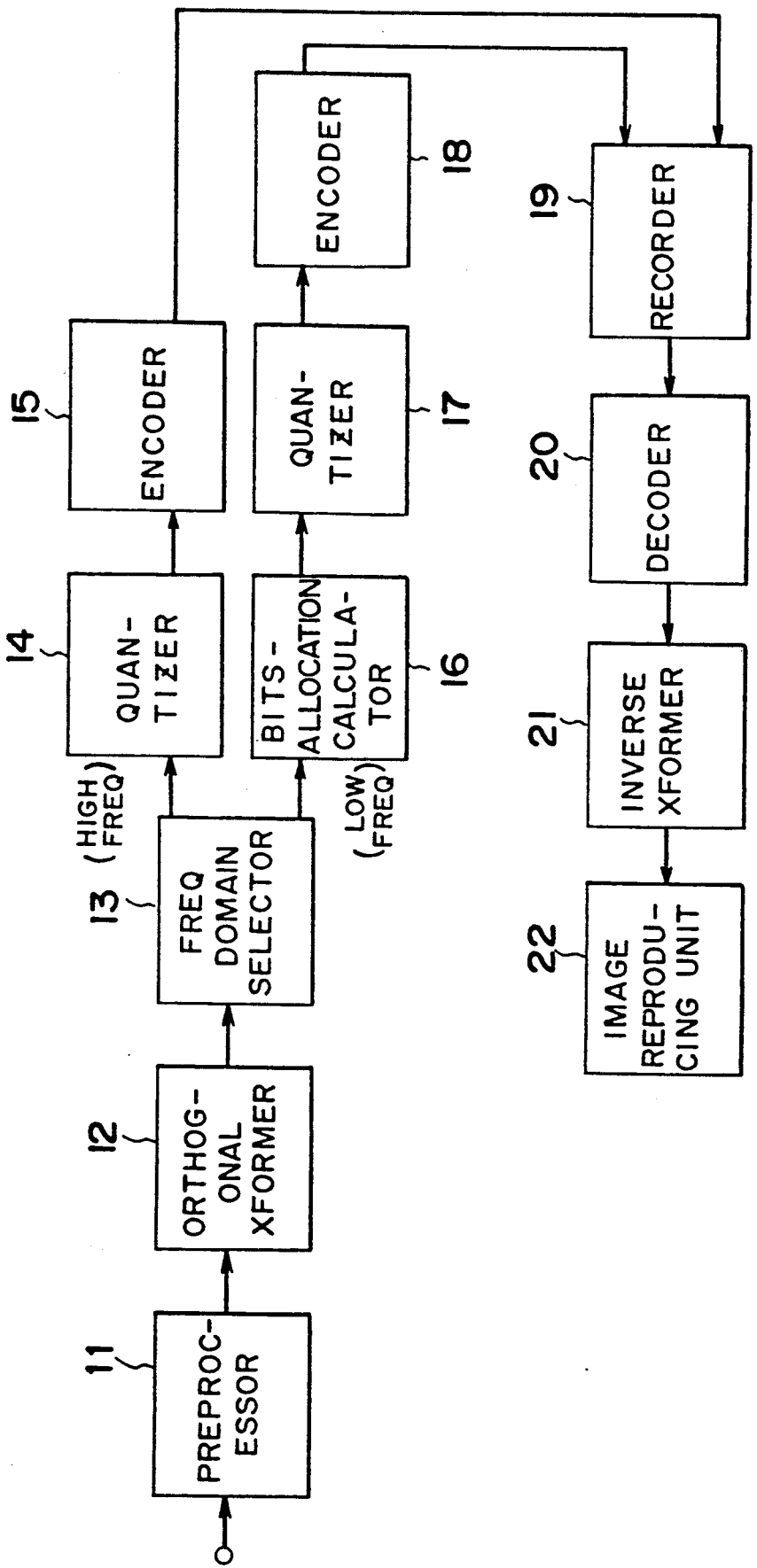
FIG. 1 shows a block diagram of an orthogonal transform coding device for image data as an embodiment of the present invention.

FIG. 1 is a block diagram illustrating a device for orthogonal transform coding of image data as an embodiment of the present invention. This device is comprised of a preprocessor 11, orthogonal transform circuit 12, frequency-domain selector 13, quantizer 14 for high frequency components, encoder 15 for high frequency components, bits-allocation calculator 16, quantizer 17 for low frequency components, encoder 18 for low frequency components, recording device 19, decoder 20, inverse transform circuit 21, and image-reproducing device 22.

With an operative setup as described above, the device for orthogonal transform coding of image data is operated as follows.

First the coding process is described.

The preprocessor 11 converts full color still image data (data whose pixels are expressed by three signals—red (R), green (G), and blue (B)—and with an image size of N×N) into Y (luminance signal) and IQ (color difference signal). After conversion into YIQ at the preprocessor 11 the image data is orthogonally transformed by the orthogonal transform circuit 12. Applicable to this orthogonal transform are many methods, which include Fourier transform, Hadamard transform, Haar transform, and Karhunen-Loeve transform (KL transform). The following explanation of the example is based on the use of discrete cosine transform (hereinafter referred to as "DCT"). The data, therefore, are converted to spatial frequencies having conversion axes which are independent of each other by DCT at the orthogonal transform circuit 12.

Figure 2:
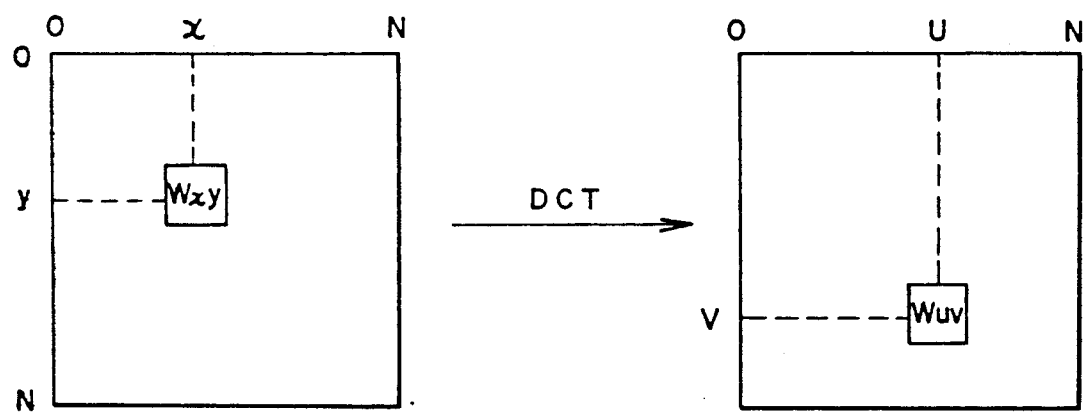
FIG. 2 shows an explanatory view of an orthogonal transform of image data based on DCT.

FIG. 2 gives an idea of the transform by DCT. In FIG. 2, (x, y) indicates the location of a pixel on the display and Wxy a pixel value at the position (x, y); (u, v) represents a frequency component obtained after conversion into a spatial frequency and Wuv a DCT coefficient of the (u, v) component in the spatial frequency domain. The conversion from Wxy to Wuv in the above description can be formulated as $$W_{uv} = \frac{4C(u)C(v)}{N^2} \sum_{x=0}^{N-1} \sum_{y=0}^{N-1} W_{xy} \cos\frac{(2x+1)u\pi}{2N} \cos\frac{(2y+1)v\pi}{2N}$$

$(U, V = 0, 1, \ldots, N-1)$ wherein $$C(u) = \begin{cases} \sqrt{2}/2 & U = 0 \\ 1 & U = 1, \ldots, N-1 \end{cases}$$

After DCT-based conversion from space coordinates to a spatial frequency by this formula, the data are divided into a low frequency domain and a high frequency domain by the frequency-domain selector 13 as described next.

The energy distribution of spatial frequency components differs according to image data. Therefore, in order to adaptively process any image data thus differing in energy distribution of the spatial frequency components, four different kinds of patterns of domains are set, as exemplified in two-dimensional array by FIGS. 3(a) through 3(d), to determine the low frequency domain of image data converted to spatial frequencies (orthogonally transformed image data). These domain patterns are each divided into a low frequency domain (marked by oblique lines) and a high frequency domain according to predetermined thresholds for spatial frequency components. In this example, the low frequency domain in a pattern of domain is designed to occupy one quarter of the whole domain.

The most suitable pattern of domain for an orthogonally transformed image data entered is selected from among the above-mentioned four kinds of patterns of domain on the basis of distribution of energy in the following manner: first, the sum of absolute values of the DCT coefficients of each orthogonally transformed image data at the part marked by oblique lines (i.e., a low frequency domain) is calculated with respect to the respective four different domain patterns of FIGS. 3(a) through 3(d); then, from the four kinds of domain patterns a pattern in which the sum is the greatest is selected; the low frequency domain in the domain pattern thus selected is determined to be the low frequency domain of the orthogonally transformed image data. Patterns as shown in FIGS. 3(e) through 3(l) can be used as alternative domain patterns.

This selection of low frequency domains is explained in further detail with reference to an actual example as follows. FIG. 4 shows the DCT coefficients expressed in a two-dimensional array which have been obtained through an orthogonal transform of an image into a spatial frequency system with a size 16×16. In this particular case of FIG. 4, the sum of the absolute values of the DCT coefficients present in the part corresponding to the respective low frequency domains of FIGS. 3(a) through 3(d) comes to 102821 with respect to the low frequency domain in FIG. 3(a), 102892 with respect to that in FIG. 3(b), 103467 with respect to that in FIG. 3(c), and 103401 with respect to that in FIG. 3(d). Accordingly, the part marked by oblique lines in the pattern of FIG. 3(c), where the sum is the greatest, is selected as the low frequency domain of the orthogonally transformed image data of FIG. 4.

The part remaining after selection of the low frequency domain in the pattern of domain FIG. 3(c) (the part not marked by oblique lines) is used as a high frequency domain.

A description will now follow with respect to the methods of quantization and encoding of the information in the low frequency domain, for which the bits-allocation calculating circuit 16, quantizer 17 and encoder 18 are used.

Figure 5:
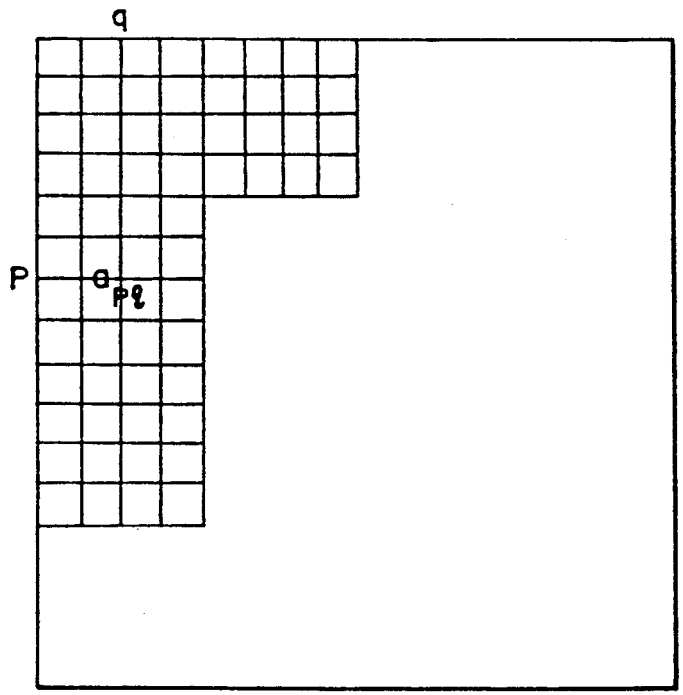
FIG. 5 is an example of arrays of blocks in the low frequency domain.

As shown in FIG. 5, the low frequency domain of the orthogonally transformed image data in FIG. 4, which has been marked out as mentioned above, is divided into blocks, for example, with DCT coefficients in a 4×4 array as a unit. Since image data obtained by DCT, as is known, assume Gaussian distribution or Laplacian distribution, a logarithmic compression method using a logarithmic value of the absolute value of each DCT coefficient is suitable for compressing the DCT coefficients of the orthogonally transformed image data. Quantization is effected by calculating the mean of the logarithmically compressed DCT coefficients for each of the above-mentioned blocks. This quantization is a uniform quantization.

The mean of the logarithmically compressed DCT coefficients in each block is calculated by the following formula:

$$\hat{\sigma} pq = \frac{1}{16} \sum_{i=4p}^{4p+3} \sum_{j=4q}^{4q+3} \log_2 |Wij|$$

$$\left(p, q = 0, \ldots, \frac{N}{4} - 1\right)$$

wherein $\hat{\sigma}$ pq is the mean of the DCT coefficients in the block located at (p, q) in the spatial frequency domain, and Wij represents DCT coefficients in the block.

On the basis of the mean values of the compressed DCT coefficients obtained for each block as mentioned above, the bits-allocation calculating circuit 16 calculates the number of bits to be allocated to each block as follows: on the assumption that the DCT coefficients assume Gaussian distribution, the bits allocation to make the mean squared error smallest can be represented as $$R pq = \overline{R} - \frac{1}{2} \hat{\sigma} pq - Rl$$

wherein R pq represents the number of bits to be allocated to the block located at (p, q) in the spatial frequency domain, $\overline{R}$ the mean of the numbers of bits allocated to each block in the low frequency domain, and Rl the mean of $\log_2 |Wij|$ in the low frequency domain as a whole.

Upon thus obtaining the numbers of bits to be allocated to each block, the DCT coefficients Wij are quantized by means of signs of Wij and uniform quantization of $\log_2 |Wij| - \hat{\sigma}$ pq at the quantizer 17. Accordingly, the data composed of low frequencies, to which man's vision is sensitive, are outputted from the encoder 18 in three kinds of information, which are signs of Wij, $\log_2 |Wij| - \hat{\sigma}$ pq, and $\hat{\sigma}$ pq all of which have been encoded by the encoder 18.

Thus, in encoding of data in a low frequency domain of a spatial frequency domain, bits are allocated block-wise according to the magnitude of the mean of the DCT coefficients in each block so that, in a low frequency domain where man's vision is sensitive, a large number of bits are allocated to a block where the energy is great, and accordingly, coding can be achieved at a high compression rate without impairing the images in quality.

A description will now be made with respect to the methods for quantization and coding of data in high frequency domains for which a quantizer 14 and an encoder 15, both for high frequency components, are used.

The quantization and encoding of data in a high frequency domain will now be explained in detail with reference to an actual example. In this example, high frequency components are quantized at a $2^m$ level and by allocating one bit to the sign (plus sign or minus sign)

of DCT coefficients and (m − 1) bits to the DCT coefficients themselves.

The explanation below refers to a case where m=3 and DCT coefficients arranged in a two dimensional space as shown in FIG. 4 are used as orthogonally transformed image data. The quantizer 14 quantizes the data according to the absolute values of the DCT coefficients $W_{ij}$ in the high frequency domain in FIG. 4. The following is an example of the quantization.

$$\begin{array}{l} 0 \text{ for } 0 \leq |W_{ij}| < 23 \\ 1 \text{ for } 23 \leq |W_{ij}| < 45 \\ 2 \text{ for } 45 \leq |W_{ij}| < 91 \\ 3 \text{ for } 91 \leq |W_{ij}| \end{array}$$

Figure 6A:
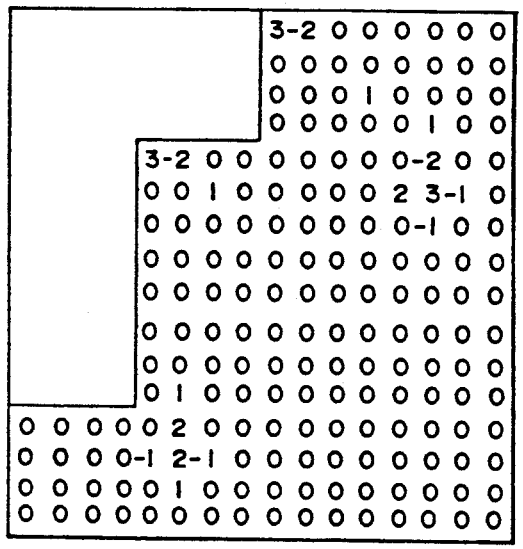
FIGS. 6(a)-(d) show examples of quantized values, bit planes, and coded data of DCT coefficients in a high frequency domain.
Figure 6B:
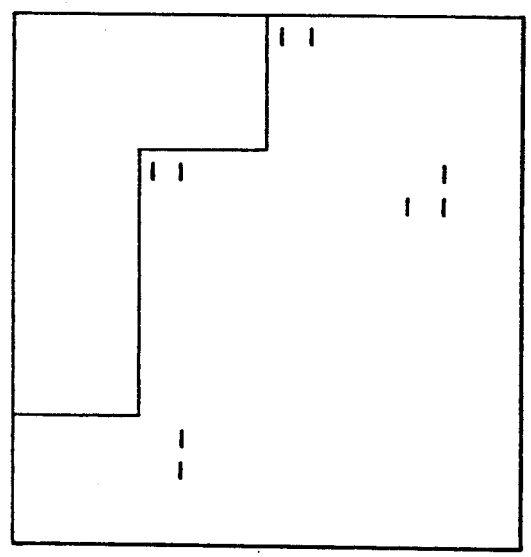
Figure 6C:
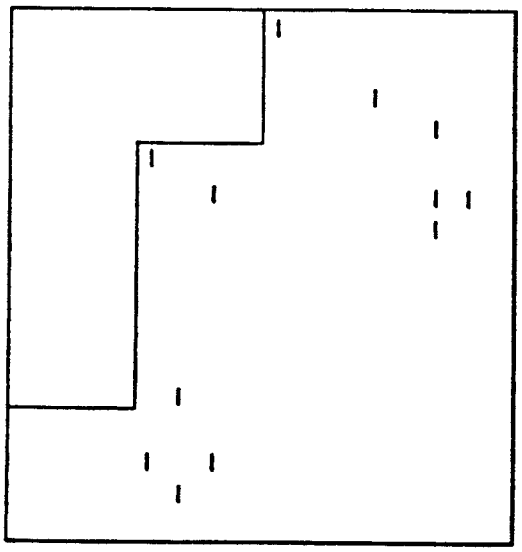
Figure 6D:
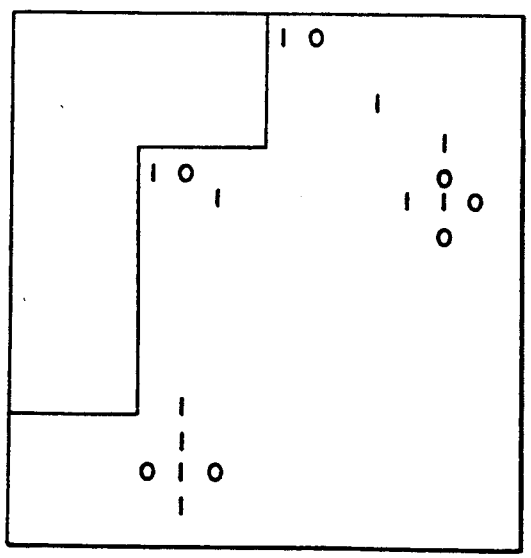

FIG. 6(a) shows the results. These results are coded using two bits. FIG. 6(b) is the second (i.e., high) bit plane resulting from decomposition of quantized values of FIG. 6(a) into bits, and FIG. 6(c) is the first (i.e., low) bit plane resulting from the same decomposition. The encoder 15 performs run length coding for each bit plane. Also the encoder 15 performs encoding of plus and minus signs of the DCT coefficients $W_{ij}$ only where the coefficients are other than 0, with 1 for the plus sign and 0 for the minus sign as shown in FIG. 6(d). Thus, run-lengths for the bit planes and sign codes are outputted from the encoder 15 as information on high frequency components.

Figures 8A, 8B:
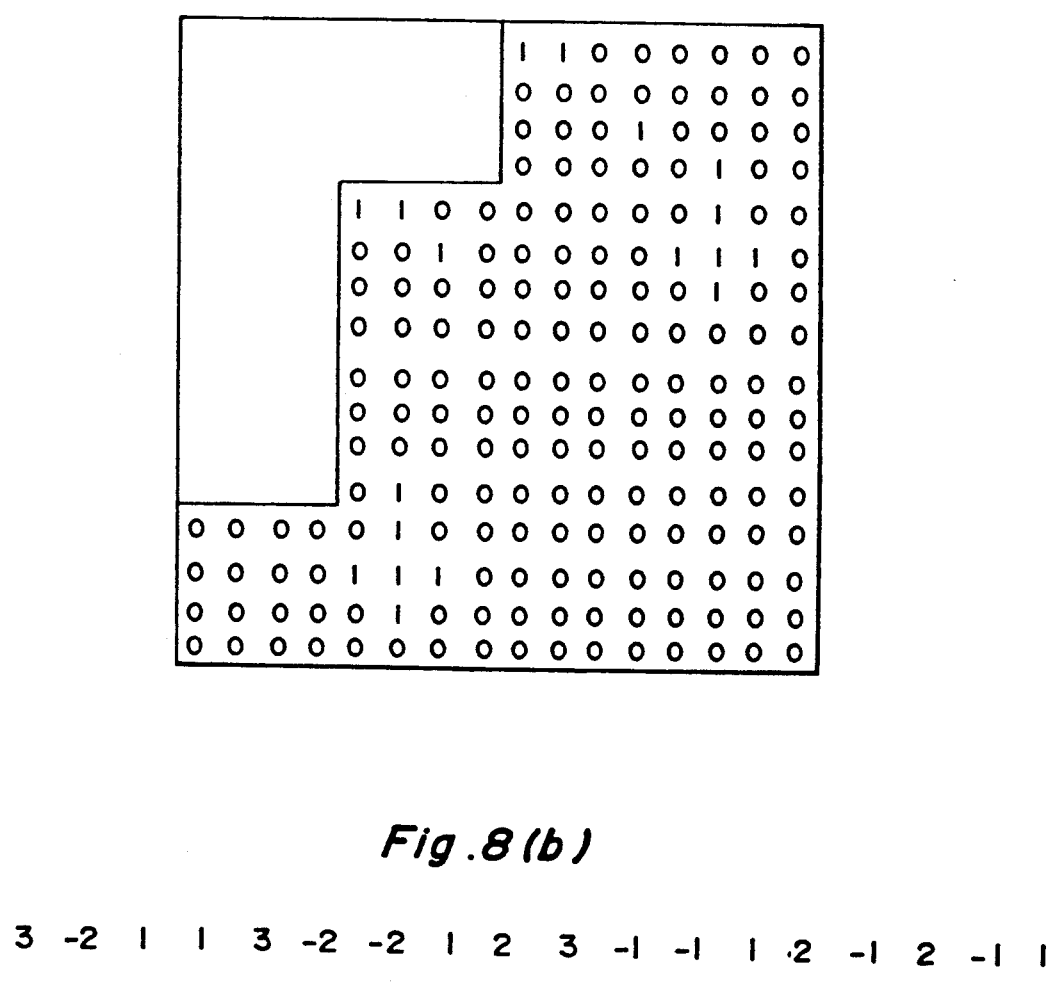

The high frequency components of data can also be encoded as follows. Each of the coefficients other than ones assuming the quantized value of 0 in FIG. 6(a) is expressed by 1, as shown in FIG. 8(a); only the DCT coefficients expressed by 1 are taken out and their values, inclusive of their signs, are arranged in sequence in a row as shown in FIG. 8(b). Next, run-length coding is carried out with respect to the quantized coefficients having the value of 0 in FIG. 8(a), and the string of coefficients in FIG. 8(b) are encoded with 3 bits per coefficient (in this particular case). The encoding results are outputted to the recording device 19. In transmitting the string of coefficients in FIG. 8(b), the compression rate can be prevented from decreasing if the number of bits to be allocated to the coefficients is varied in accordance with the appearance frequency of the coefficients when many of the values exceed a threshold so that a small number of bits are allocated to coefficients whose appearance is not frequent and whose absolute values are small and a large number of bits are allocated to coefficients whose appearance is frequent and whose absolute values are large.

Thus, according to the present invention, low frequency components of image data are encoded by allocating to each bits suited to the magnitude of the mean of an orthogonally transformed image data and high frequency components of the image data by run-length coding for each bit plane so that the low frequency domain, to which man's vision is sensitive, can be encoded with bits corresponding to the magnitude of the energy and the high frequency domain, with which man's vision is less sensitive, with a small number of bits. Therefore, the volume of image data can be compressed to a high degree without involving impairment of the picture quality.

The data of the low and high frequency domains obtained as described above are stored in the recording device 19 (magnetic tape, floppy disk, etc.).

A description will now be given with respect to decoding.

The data read out from the recording device 19 are inputted to and decoded by the decoder 20 as follows.

With respect to the data in the low frequency domain, the number of bits allocated to each of the blocks is calculated in the same manner as in the coding mentioned above on the basis of the mean value $\hat{\sigma}$ pq of the DCT coefficients in each block which is read out from the recording device 19. Then, by determining a quantization step size on the basis of the number of bits allocated, the value of $\log_2 |W_{ij}| - \hat{\sigma}$ pq is calculated, and by subtracting $\hat{\sigma}$ pq therefrom, $\log_2 |W_{ij}|$ is obtained. Next, assuming that the obtained value of $\log_2 |W_{ij}|$ is W, the Wth power of 2 is calculated so as to obtain $W_{ij}$ from $\log_2 |W_{ij}|$, that is, the DCT coefficient. In this way, the decoding is performed.

Figure 7:
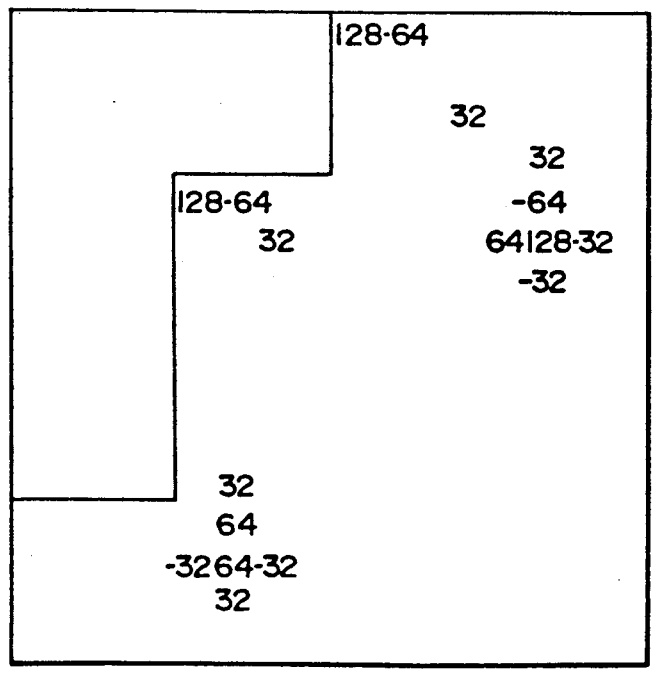
FIG. 7 shows the results of decoding of the quantized values in the high frequency domain in FIG. 6(a)

For the high frequency components of data, the bit planes in FIGS. 6(b) and 6(c) are recomposed on the basis of the run-length codes read out from the recording device 19. From these bit planes of FIGS. 6(a) and (b) and coded sign data of FIG. 6(d), the quantized values in FIG. 6(a) are obtained, and then DCT coefficients are obtained from the quantized values obtained. In this way, the decoding processing is completed. FIG. 7 shows reconstruction values of the quantized values in FIG. 6(a). The values 1, 2, and 3 in FIG. 6(a) are reconstructed to 32, 64, and 128, respectively.

Upon calculation of the DCT coefficients of the data in both the low and high frequency domains following the decoding, those two kinds of DCT coefficients are put together to recompose a spatial frequency system, which data are inputted to the inverse transform circuit 21. The inverse transform circuit 21 converts the spatial frequency system to a space coordinate system. Given $W_{uv}$ as the DCT coefficients, $W_{xy}$ as the pixel values, and $N \times N$ as the image size, an inverse discrete cosine transform can be formulated as $$W_{xy} = \frac{4C(x)C(y)}{N^2} \sum_{u=0}^{N-1} \sum_{v=0}^{N-1} W_{uv} \cos \frac{(2x+1)u\pi}{2N} \cos \frac{(2y+1)v\pi}{2N}$$

$(x, y = 0, 1, \ldots, N-1)$ wherein $$C(x) = \begin{cases} \sqrt{2}/2 & x = 0 \\ 1 & x = 1, \ldots, N-1 \end{cases}$$

The pixel value obtained by the above-mentioned formula consists of a luminance signal (Y) and a color difference signal (I, Q). This value, therefore, is converted to color signals consisting of red (R), green (G) and blue (B), which are inputted to the image-reproducing device 22. A reproduced image based on the RGB signals is obtained on the image-reproducing device 22.

The parameters, such as the quantization step size, threshold and block size, which are used for the image data orthogonal transform coding of the present invention, can be obtained experimentally or empirically.

FIGS. 9(a)–(e) show a modification of the quantization and encoding of data in a high frequency domain, wherein a vector quantization is adopted to further quantize the quantized values of FIG. 6(a).

First, the principle of a vector quantization will be outlined. A two-dimensional signal space to be quantized is divided into a plurality of blocks. Let $n \times n$ be the size of each of the blocks. Furthermore, given $R_1 \ldots R_M$ as divisions numbering M into which $n^2$-dimensional signal space $R^{n^2}$ in one of the blocks is split against an input vector $x = [x_1 \ldots x_n 2]$, $Y = \{\bar{y}_1 \ldots \bar{y}_M\}$ as a set of reconstructed vectors $y_i = [y_{i1} \ldots y_{in2}]$ which is the centroid (reconstructed vector) of the partial space $R_M$, and $i = \{1, 2, \ldots M\}$ as an index set of $y_i$, the vector quantization Q can be represented as a cascade connection of a coding C and a decoding D:

$$Q(x) = y_i \text{ "if" } x \in R_i$$
$$Q = D \cdot C$$
$$C: x \to i \text{ "if" } d(x, y_i) \leq d(x, y_j) \text{ "for" } \forall j$$
$$D: i \to y_i$$

The distortion measure $d(\bar{x}, \bar{y}_i)$ represents a distance between the input and reconstructed vectors and can be defined in terms of square distortion measure norm as $$d(x, y_i) = \left[ \sum_{j=1}^{n^2} |x_j - y_{ij}|^2 \right]^{\frac{1}{2}}$$

The above-mentioned set $Y = \{\bar{y}_1 \ldots \bar{y}_M\}$ of the reconstructed vectors $y_i$ is preliminarily determined by the following procedure: by using as models the patterns which, in the respective blocks of the high frequency domain, the orthogonally transformed image data from several sheets of images selected as training sequence form, and by performing a clustering to divide $n^2$-dimensional signal space $R^{n^2}$ which an input vector forms and then calculating the centroid (reconstructed vector) of the cluster obtained by the aforesaid division, an optimum set $Y = \{\bar{y}_1 \ldots \bar{y}_M\}$ of the reconstructed vectors y is determined. The set Y of the reconstructed vectors thus determined is stored in a codebook in a memory (not shown in the drawings).

The quantizer 14 for high frequency components compares (pattern matching) the pattern of the input vector x with that of a reconstructed vector $y_i$ contained in the reconstructed vector set Y stored in the codebook as mentioned above so as to select a reconstructed vector $y_i$ which gives a minimum distortion and outputs as the quantization value the index i of the reconstructed vector $y_i$ which gives the minimum distortion as mentioned above. Then, the encoder 15 encodes and outputs the index i which has been outputted by the quantizer 14.

When the data in the high frequency domain thus encoded are reproduced, the decoder 20 receives the quantizer output i and extracts a reconstructed vector $y_i$ from the same codebook which is used in encoding; and rearranges the aforesaid blocks according to the elements of the reconstructed vector $y_i = \{y_{i1} \ldots y_{in2}\}$.

Therefore, the quality of the image and the compression rate in vector quantization is dependent upon the number of the reconstructed vectors stored in a codebook referred to above and the selection of the reconstructed vector. And these reconstructed vectors are highly dependent on the images selected as a training sequence. Therefore, when the entire spatial frequency domain is selected as a training sequence in vector quantization, an original image is preprocessed by normalization, orthogonal transform, or the like so as to minimize the dependency upon the original image. However, it has been difficult to adapt the quantization satisfactorily to images when the orthogonally transformed image data of the original image assume various different patterns.

In this modification, however, the vector quantization is performed exclusively with the high frequency domain of the orthogonally transformed data of the original image. As mentioned above, man's vision is not very sensitive to high frequency domains. Moreover, since the energy does not concentrate locally in a high frequency domain, the orthogonally transformed image data themselves include patterns many of which resemble each other. The vectors in a high frequency domain alone, therefore, are less varied in kind than when the entire spatial frequency domain is used for a training sequence. Thus orthogonally transformed image data in a high frequency domain can be coded at a certain compression rate without impairing the image so that images of good quality can be achieved in the reproduction.

Figures 9B, 9C, 9D, 9E:
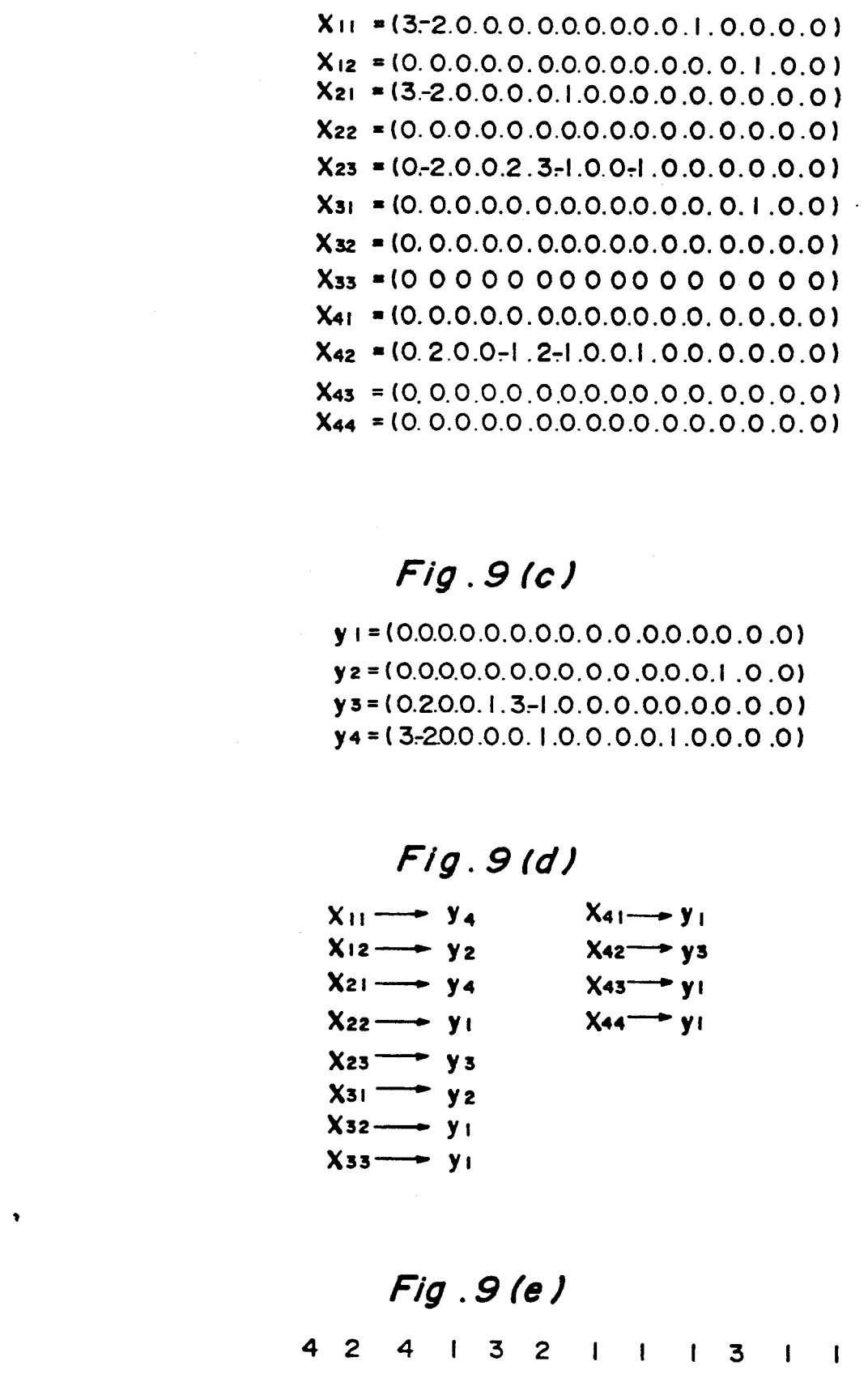

According to the modification, the quantizer 14 divides the high frequency domain in FIG. 6(a) into twelve blocks each with a block size of $4 \times 4$, as shown in FIG. 9(a). Elements of the input vectors $x_{11}, x_{12} \ldots x_{43}, x_{44}$ in each of the blocks are shown in FIG. 9(b). Now, set Y of the reconstructed vectors $y_i$ stored in the codebook be composed of four kinds of reconstructed vectors $y_1, y_2, y_3, y_4$, as shown in FIG. 9(c). Then the quantizer 14 performs a pattern matching between each of the input vectors x and the four reconstructed vectors $y_1, y_2, y_3, y_4$ so that a reconstructed vector that makes the distortion measure $d(\bar{x}, \bar{y}_i)$ the smallest is selected with respect to every input vector x. FIG. 9(d) shows combinations of the input vectors x and reconstructed vectors $y_i$ which have resulted from this pattern matching. Finally, the quantizer 14 outputs a string of quantized values (that is, a string of indexes i of the reconstructed vectors $y_i$ which have been obtained as above) as shown in FIG. 9(e). Next the encoder 15 encodes the quantized values i received from the quantizer 14.

As obvious from the above description, because image data in a high frequency domain of a spatial frequency domain are quantized for each block by a technique of vector quantization utilizing the pattern matching, the compression of images in the high frequency domain is efficiently effected irrespective of the content of the images by virtue of limited presence of vectors in kind. In addition, due to dullness of man's visual sense in the high frequency domain, the picture quality is not affected by the compression of the images. Accordingly, this modification can perform an efficient coding of images at a certain compression rate irrespective of the content of images without impairment of picture quality.

In this modification, decoding of the data for the high frequency domain stored in the recording device 19 (magnetic tape, floppy disk, etc.) is carried out in the following manner. Because decoding of the data for the low frequency domain in this modification is the same as that in the aforementioned embodiment, the description on this is omitted here.

Figure 10A:
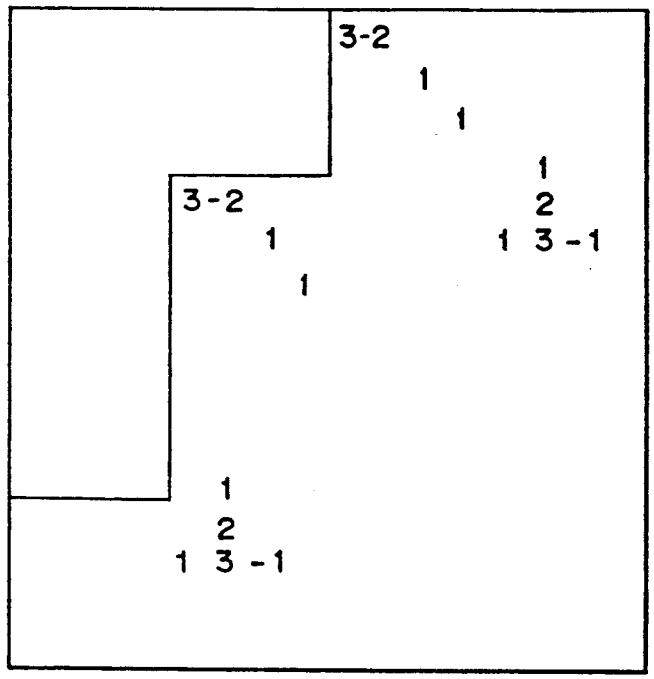
FIGS. 10(a) and (b) show quantized values obtained by the vector quantization in the high frequency domain and decoding results of the quantized values, respectively.
Figure 10B:
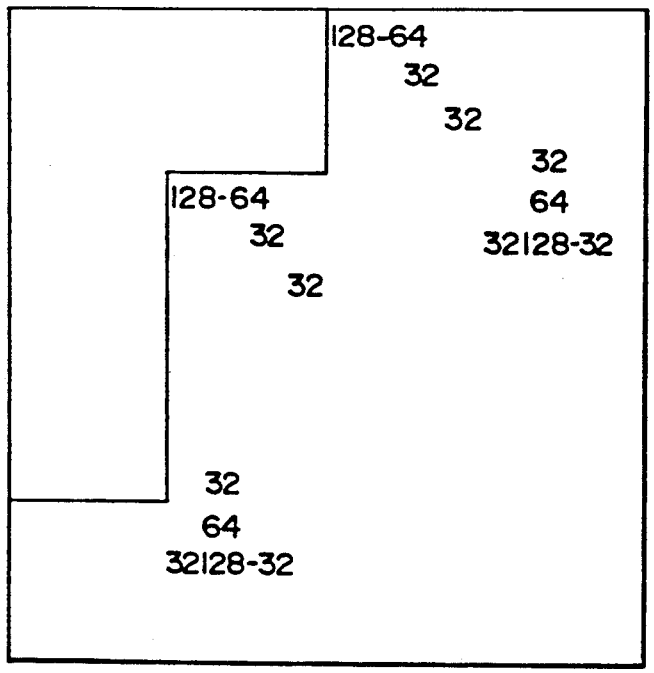
Figure 11:
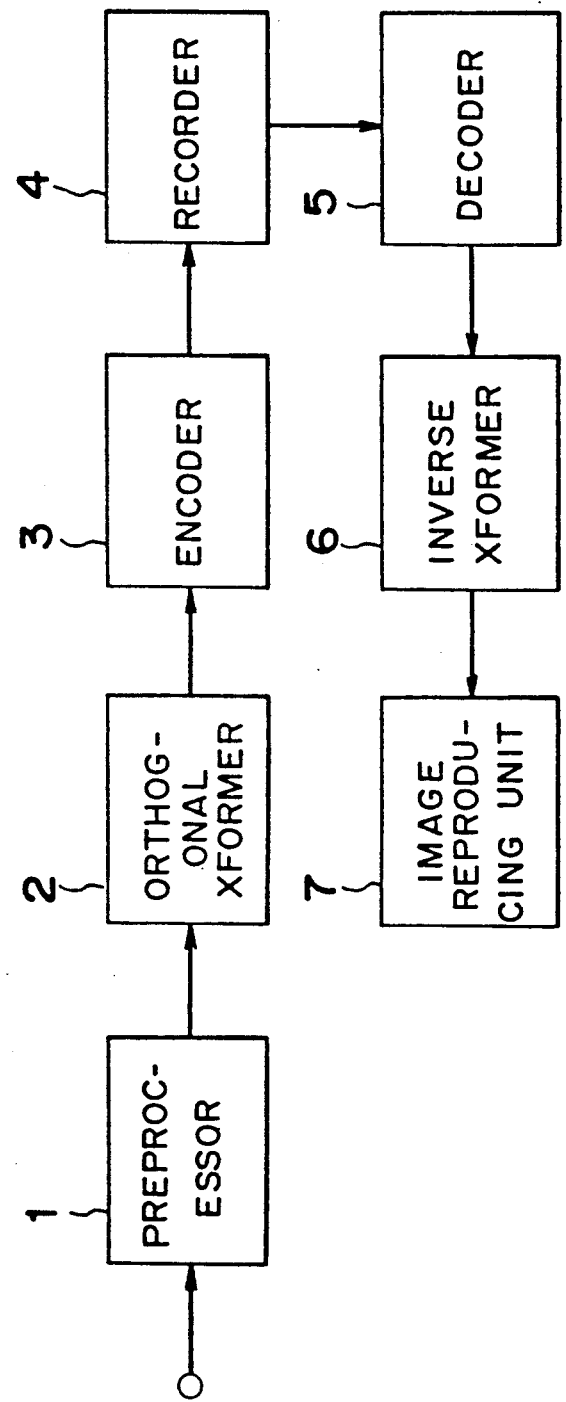
FIG. 11 is a block diagram of a device for orthogonal transform coding of image data in the prior art.

The indexes i are read out from the recording device 19, and according to the indexes i and by referring to the same codebook which is stored in a memory (not shown in the drawings) in the decoder 20 and used in the encoding as well, the reconstructed vectors $y_i$ corresponding to the indexes i are extracted. The reconstructed vectors $y_i$ thus extracted are each set in a two-dimensional array in the blocks corresponding to the high frequency domain of the spatial frequency domain. FIG. 10(a) shows the quantized values in the spatial frequency domain resulting from the above-mentioned procedure. FIG. 10(b) shows the results of decoding of the quantized values in FIG. 10(a). As shown therein, the codes 1, 2, and 3 in FIG. 10(a) are decoded to 32, 64, and 128 respectively.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for orthogonal transform coding image data, comprising the steps of:
   (a) orthogonally transforming image data from space coordinates to spatial frequencies;
   (b) preparing a plurality of domain patterns each having low and high frequency domains therein;
   (c) dividing a spatial frequency domain of orthogonally transformed image data into a low frequency domain and a high frequency domain according to a threshold;
   (d) summing absolute values of the orthogonally transformed data belonging to the low frequency domain of each domain pattern;
   (e) specifying the low frequency domain of a domain pattern in which the sum of the absolute values is the largest as a low frequency domain of the orthogonally transformed image data and specifying a remaining part of the same domain pattern as a high frequency domain of the orthogonally transformed image data;
   (f) encoding the orthogonally transformed data in the low frequency domain by dividing the low frequency domain into a plurality of blocks and calculating respective mean values of the orthogonally transformed data in the blocks so as to allocate a large number of bits to a block which has a mean value larger than a specified value and a small number of bits to a block which has a mean value smaller than the specified value; and
   (g) encoding the orthogonally transformed data in the high frequency domain in a manner different from the encoding of said step (f) so as to allocate a small number of bits to the high frequency domain.

2. The orthogonal transform coding method as claimed in claim 1, wherein said step (g) comprises the steps of;
   (h) decomposing the transformed data into bit planes; and
   (i) performing run length coding for each bit plane.

3. The orthogonal transform coding method as claimed in claim 1, wherein said step (g) comprises the steps of:
   (h) dividing the high frequency domain into a plurality of blocks; and
   (i) comparing data patterns of the orthogonally transformed data in the respective blocks with a limited number of representative data patterns that are stored in a memory so as to select representative patterns which are closest to the respective data patterns of the orthogonally transformed image data with respect to each of the blocks so as to encode the high frequency domain of the orthogonally transformed data according to indexes representing selected representative patterns.

4. The orthogonal transform coding method as claimed in claim 1, wherein said step (a) uses a discrete cosine transform as the orthogonal transform.

5. The orthogonal transform coding method as claimed in claim 1, wherein said step (a) uses a Fourier transform as the orthogonal transform.

6. The orthogonal transform coding method as claimed in claim 1, wherein said step (a) uses a Hadamard transform as the orthogonal transform.

7. The orthogonal transform coding method as claimed in claim 1, wherein said step (a) uses a Haar transform as the orthogonal transform.

8. The orthogonal transform coding method as claimed in claim 1, wherein said step (a) uses a Karkunen-Loeve transform as the orthogonal transform.

9. A system for orthogonal transform coding image data comprising:
   transform means for orthogonally transforming image data from space coordinates to spatial frequencies;
   pattern means, operatively connected to said transform means, for preparing a plurality of domain patterns each having low and high frequency domains therein and for dividing a spatial frequency domain of orthogonally transformed image data into a low frequency domain and a high frequency domain according to a threshold;
   summing means, operatively connected to said transform means, for summing absolute values of the orthogonally transformed data belonging to said low frequency domain of each domain pattern;
   frequency selecting means, operatively connected to said summing areas, for specifying the low frequency domain of a domain pattern in which the sum of the absolute values is the largest as a low frequency domain of the orthogonally transformed image data and for specifying a remaining part of the same domain pattern as a high frequency domain of the orthogonally transformed image data;
   first encoding means, operatively connected to said frequency selecting means, for encoding the orthogonally transformed data in said low frequency domain;
   said first encoding means dividing said low frequency domain into a plurality of blocks and calculating respective mean values of the orthogonally transformed data in said blocks so as to allocate a large number of bits to a block which has a mean value larger than a specified value and a small number of bits to a block which has a mean value smaller than said specified value; and
   second encoding means, operatively connected to said frequency selecting means, for encoding the orthogonally transformed data in said high frequency domain in a manner different from said first encoding means so as to allocate a small number of bits to said high frequency domain.

10. The orthogonal transform coding system as claimed in claim 9, wherein said second encoding means decomposes the transformed data into bit planes and performs run length coding for each bit plane.

11. The orthogonal transform coding system as claimed in claim 9, wherein said second encoding means divides said high frequency domain into a plurality of blocks and compares data patterns of the orthogonally transformed data in the respective blocks with a limited number of representative data patterns that are stored in a memory so as to select representative patterns which are closest to the respective data patterns of the orthogonally transformed image data with respect to each of said blocks so as to encode said high frequency domain of the orthogonally transformed data according to indexes representing selected representative patterns.

12. The orthogonal transform coding system as claimed in claim 9, wherein said transform means uses a discrete cosine transform as the orthogonal transform.

13. The orthogonal transform coding system as claimed in claim 9, wherein said transform means uses a Fourier transform as the orthogonal transform.

14. The orthogonal transform coding system as claimed in claim 9, wherein said transform means uses a Hadamard transform as the orthogonal transform.

15. The orthogonal transform coding system as claimed in claim 9, wherein said transform means uses a Haar transform as the orthogonal transform.

16. The orthogonal transform coding system as claimed in claim 9, wherein said transform means uses a Karhunen-Loeve transform as the orthogonal transform.

* * * * *